United States Patent
Campbell et al.

(10) Patent No.: US 7,029,516 B2
(45) Date of Patent: Apr. 18, 2006

(54) FILTERS AND METHODS OF MAKING AND USING THE SAME

(75) Inventors: Daniel P. Campbell, Atlanta, GA (US); Jim Suggs, Corning, NY (US); Jeffrey L. Moore, Newark, DE (US); Srinivas Somayajula, Woodbury, MN (US); Thomas R. Mohs, Eagan, MN (US)

(73) Assignee: Georgia Tech Research Corporation, Atlanta, GA (US)

(*) Notice: Subject to any disclaimer, the term of this patent is extended or adjusted under 35 U.S.C. 154(b) by 73 days.

(21) Appl. No.: 10/693,601

(22) Filed: Oct. 24, 2003

(65) Prior Publication Data

US 2005/0000901 A1 Jan. 6, 2005

Related U.S. Application Data

(60) Provisional application No. 60/420,984, filed on Oct. 24, 2002.

(51) Int. Cl.
*B01D 53/04* (2006.01)

(52) U.S. Cl. .............. 95/90; 95/141; 95/143; 95/285; 95/287; 96/135; 96/153; 55/524; 55/528

(58) Field of Classification Search ........... 55/524, 55/527, 528, DIG. 5; 95/90, 141, 143, 273, 95/285, 287; 96/108, 134, 135, 153, 154; 210/660

See application file for complete search history.

(56) References Cited

U.S. PATENT DOCUMENTS

| | | | | |
|---|---|---|---|---|
| 3,118,747 A | * | 1/1964 | Codignola et al. ............ 95/123 |
| 3,664,095 A | * | 5/1972 | Asker et al. .................. 96/154 |
| 3,686,827 A | * | 8/1972 | Haigh et al. .................. 95/141 |
| 3,727,379 A | | 4/1973 | Bijleveld et al. |
| 4,239,516 A | * | 12/1980 | Klein ........................... 502/62 |
| 4,286,977 A | * | 9/1981 | Klein ........................... 55/524 |
| 4,293,378 A | * | 10/1981 | Klein ........................... 162/145 |
| 4,863,494 A | | 9/1989 | Hayes |
| 4,863,495 A | | 9/1989 | Rafson |
| 4,892,719 A | | 1/1990 | Gesser |
| 4,983,193 A | * | 1/1991 | Tani et al. .................... 55/487 |
| 5,037,624 A | | 8/1991 | Tom et al. |
| 5,281,257 A | | 1/1994 | Harris |
| 5,346,535 A | | 9/1994 | Kuznicki et al. |
| 5,529,609 A | | 6/1996 | Gooch et al. |
| 5,627,329 A | | 5/1997 | Krishnan et al. |

(Continued)

FOREIGN PATENT DOCUMENTS

EP    0 417 407    3/1991

(Continued)

OTHER PUBLICATIONS

Gesser et al., "The Use of Reactive Coatings on Filters for the Removal of Indoor Gaseous Pollutants," *Environmental International*, vol. 18, No. 5, pp. 463-466, 1992.

(Continued)

*Primary Examiner*—Robert H. Spitzer
(74) *Attorney, Agent, or Firm*—Merchant & Gould P.C.

(57) ABSTRACT

Filters for removing particulate and gaseous organic and inorganic materials from a fluid stream are disclosed. The filters may contain a polymer matrix and optional sequestering agents. Methods of making filters are also disclosed. Methods of using filters to remove one or more materials from a fluid stream, such as an air stream, are also disclosed.

21 Claims, 3 Drawing Sheets

U.S. PATENT DOCUMENTS

| | | | |
|---|---|---|---|
| 5,681,788 | A | 10/1997 | Kanesaka et al. |
| 5,702,505 | A | 12/1997 | Izumi et al. |
| 5,772,738 | A * | 6/1998 | Muraoka .................. 96/129 |
| 5,797,979 | A * | 8/1998 | Quinn ........................ 95/97 |
| 5,830,414 | A | 11/1998 | Ishii et al. |
| 5,891,221 | A | 4/1999 | Rohrbach et al. |
| 5,944,878 | A | 8/1999 | Lindhe |
| 5,951,774 | A | 9/1999 | Shishiguchi et al. |
| 6,083,439 | A | 7/2000 | Nastke et al. |
| 6,093,236 | A | 7/2000 | Klabunde et al. |
| 6,187,276 | B1 | 2/2001 | Sata |
| 6,228,135 | B1 | 5/2001 | Sugo et al. |
| 6,358,374 | B1 | 3/2002 | Obee et al. |
| 6,402,819 | B1 * | 6/2002 | De Ruiter et al. ........... 96/153 |
| 6,447,584 | B1 * | 9/2002 | Kishkovich et al. ......... 96/153 |
| 6,645,271 | B1 * | 11/2003 | Seguin et al. ................ 95/90 |
| 2002/0078828 | A1 * | 6/2002 | Kishkovich et al. ......... 96/108 |
| 2003/0056653 | A1 * | 3/2003 | Ueki et al. .................... 96/134 |
| 2003/0153457 | A1 * | 8/2003 | Nemoto et al. ............ 502/402 |
| 2003/0226443 | A1 * | 12/2003 | Rajagopalan et al. ........ 95/133 |

FOREIGN PATENT DOCUMENTS

SU          639 582          12/1978

OTHER PUBLICATIONS

Dallüge et al., "Unravelling the Composition of Very Complex Samples by Comprehensive Gas Chromatography Coupled to Time-Of-Flight Mass Spectrometry Cigarette Smoke," *Journal of Chromatography*, vol. 974, Issues 1-2, pp. 169-184, Oct. 2002.

Shaughnessy et al., "Indoor Chemistry: Ozone and Volatile Organic Compounds Found in Tobacco Smoke," *Environmental Science & Technology*, vol. 35, No. 13, pp. 2758-2764, Jul. 1, 2001.

Lewis et al., "Properties of Vapor Detector Arrays Formed Through Plasticization of Carbon Black-Organic Polymer Composites," *Analytical Chemistry*, vol. 74, No. 6, pp. 1307-1315, Mar. 15, 2002.

* cited by examiner

FIG. 1A
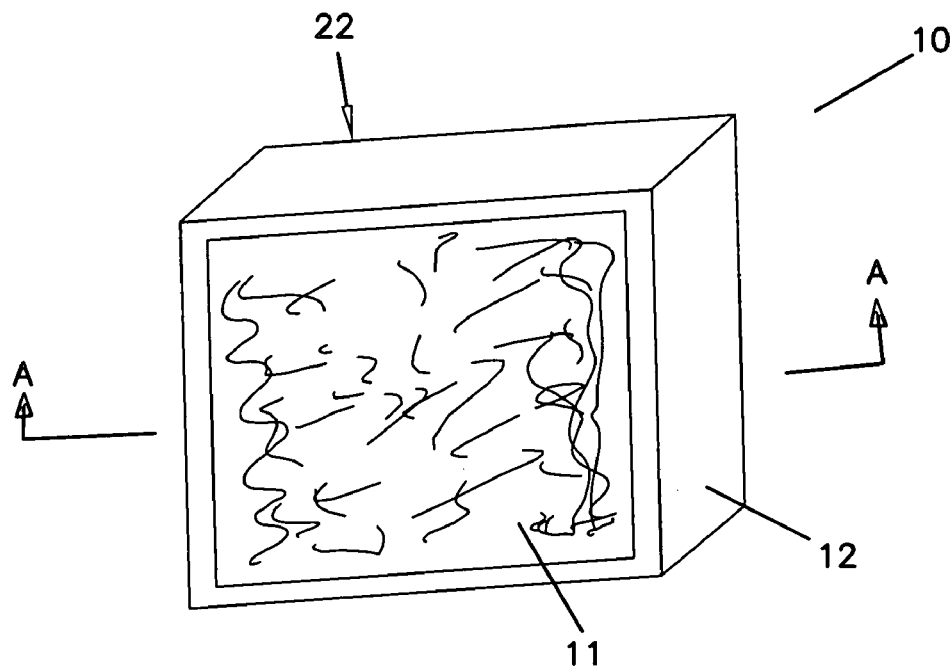
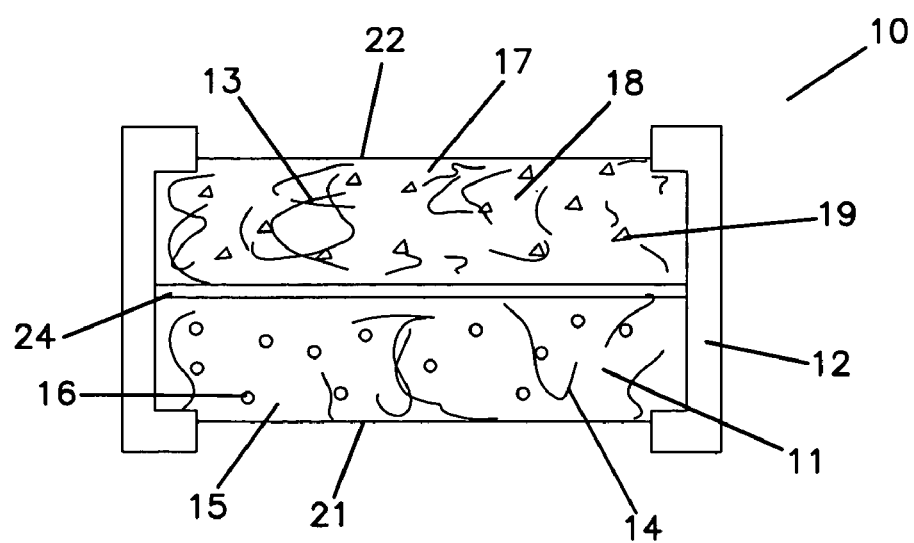
FIG. 1B

FILTERS AND METHODS OF MAKING AND USING THE SAME

RELATED APPLICATIONS

This application claims the benefit of priority to U.S. provisional patent application Ser. No. 60/420,984 filed on Oct. 24, 2002, the subject matter of which is incorporated herein by reference.

FIELD OF THE INVENTION

The present invention is directed to filters for removing particulate and gaseous organic and inorganic materials from a fluid stream. The present invention is further directed to methods of making filters, and methods of using filters to remove one or more materials from a fluid stream, such as an air stream.

BACKGROUND OF THE INVENTION

The need for air-filtration systems for improvement of indoor air quality is well recognized, and a substantial industry exists to manufacture, deliver, install, and maintain indoor air filtration systems. In spite of the maturity of this industry, however, there still remains substantial opportunity for improvement of indoor air quality. In particular, most of the air filtration technology developed to date is focused on removal of particulate materials from an air stream, using passive filters constructed from fibrous materials such as glass fibers, which are formed into woven or non-woven mat-like structures. These fibrous air filtration media inherently are ineffective at removal of particulates and/or molecular compounds that are smaller that the pore size created by the interengaged fibers. In addition, there is a natural limit to the size of the particles that can be removed by such filters, since decreasing pore size in this type of filter structure is concomitantly accompanied by an increase in the pressure drop across the filter. Further, these filtration media are inert to other major contributors to indoor air pollution, which are volatile and semi-volatile organic and inorganic compounds.

The need to remove volatile and semi-volatile compounds from air streams is also recognized in the air-filtration art. Most of the technologies used to date to remove volatile and semi-volatile compounds from an air stream rely on adsorption, as opposed to absorption, as a mechanism for trapping these compounds. Adsorption is a process whereby volatile molecules condense onto a surface of a filtration media. Because essentially only a monolayer of molecules can adsorb, it is necessary to provide very high surface areas in order to achieve significant loadings of the adsorbed compounds. In addition, as adsorption proceeds and the available surface for adsorption decreases, the rate of adsorption also decreases. Moreover, since all adsorbed molecules compete for the same surface sites, the presence of an innocuous adsorbent (such as water) can greatly reduce the capacity of the adsorbent for target volatile compounds. Despite these drawbacks, adsorption is the predominant route chosen to trap volatile organic compounds, primarily because it is considered by those skilled in the art to be the only method that has a kinetic rate great enough to be effective for removing significant levels of pollutants from an air stream.

What is needed in the art is a filter that overcomes one or more of the above-mentioned deficiencies associated with known filter media. Further, what is needed in the art is a filter that absorbed one or more materials from a fluid stream, and exhibits a desirable filtering load capacity compared to known filter media.

SUMMARY OF THE INVENTION

The present invention addresses some of the difficulties and problems discussed above by the discovery of a filter media that adsorbs and then absorbs one or more contaminants from a fluid stream, and exhibits a desirable absorption capacity compared to known filter media. In one exemplary embodiment of the present invention, the filter media has an absorption capacity of at least 0.01 grams of captured contaminants, and in some cases up to about 2.5 grams of captured contaminants or more, per gram of absorptive system material within the filter media. The filter media desirably comprises an absorptive system containing at least one polymer having acidic or basic functional groups along the polymer chain. The polymer may be a homopolymer or a copolymer comprising one or more types of acidic or basic functional groups along the polymer or copolymer chain.

In one exemplary embodiment of the present invention, the filter media comprises (a) a polymer matrix containing at least one polymer having acidic or basic functional groups along the polymer chain; and, optionally, (b) one or more additives distributed within the polymer matrix. In one desired embodiment of the present invention, the filter media comprises water as an additive distributed throughout the polymer matrix in order to assist in proton transfer throughout the polymer matrix.

The present invention is further directed to methods of making filter media. The method of making a filter media of the present invention may comprise forming a sorbent material, wherein the sorbent material comprises one or more polymeric materials, wherein at least one polymer has acidic or basic functional groups along the polymer chain. The method of making a filter media of the present invention may further comprise one or more additional steps, such as incorporating one or more optional additives into and/or onto the one or more polymeric materials.

The present invention is also directed to methods of using a filter media to remove one or more contaminants, particles or compounds from a fluid stream. The method may be used to remove one or more volatile or semi-volatile compounds and/or particles from a fluid stream. The method may comprise bringing a fluid stream and a filter media into contact with one another. The contacting step may simply require the fluid stream to contact a portion of the filter media, or may comprise passing the fluid stream through a portion of the filter media.

Filter media of the present invention may be designed to remove trace amounts of specific contaminants or compounds from a fluid stream and/or significant amounts of specific contaminants or compounds from a fluid stream. Filter media of the present invention may be used in a variety of applications including, but not limited to, industrial applications, commercial applications, military applications (e.g., to combat chemical warfare agents), and household applications.

These and other features and advantages of the present invention will become apparent after a review of the following detailed description of the disclosed embodiments and the appended claims.

BRIEF DESCRIPTION OF THE FIGURES

FIG. 1a depicts an exemplary filter media of the present invention;

FIG. 1b provides a cross-sectional view of the exemplary filter media of FIG. 1a along line A—A;

FIG. 3b depicts a schematic of an exemplary 30.5 cm (1 foot)×30.5 cm (1 foot) duct assembly for use in a filter testing apparatus as shown in FIG. 3a.

DETAILED DESCRIPTION OF THE INVENTION

Figure 2A:
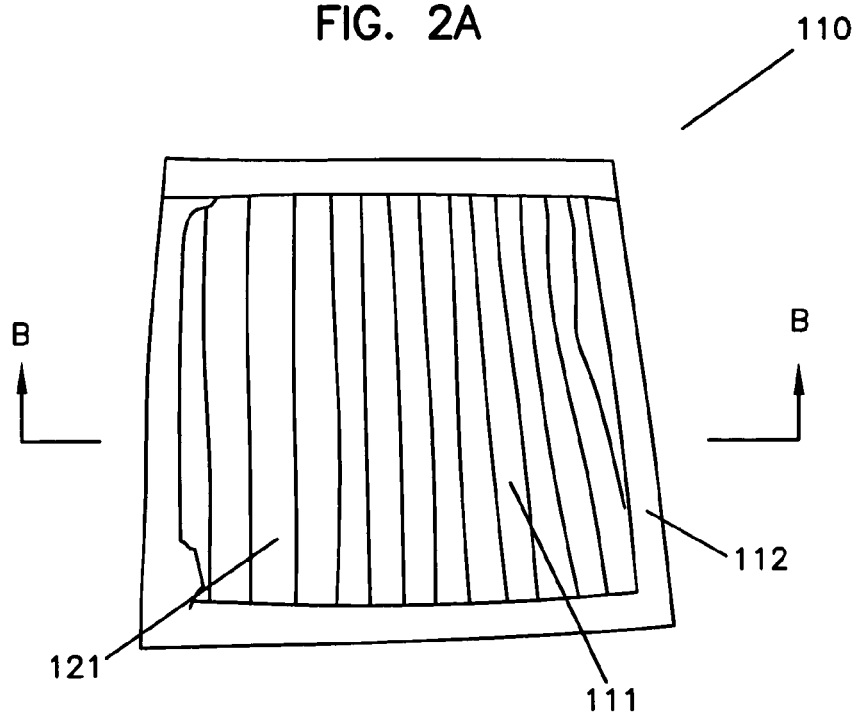
FIG. 2a depicts an exemplary filter media of the present invention.

To promote an understanding of the principles of the present invention, descriptions of specific embodiments of the invention follow and specific language is used to describe the specific embodiments. It will nevertheless be understood that no limitation of the scope of the invention is intended by the use of specific language. Alterations, further modifications, and such further applications of the principles of the present invention discussed are contemplated as would normally occur to one ordinarily skilled in the art to which the invention pertains.

The present invention is directed to filter media, which may be used to remove a variety of contaminants from a fluid stream, such as an air stream. The filter media of the present invention comprise a number of components resulting in a filter media, which possesses desired absorption properties. Unlike most known filtration media, the filter media of the present invention utilizes absorption technology, as oppose to adsorption technology.

I. Filter Media Characteristics

A. Filter Properties

The filter media of the present invention has one or more of the following filter properties, which distinguish the filter media of the present invention from known filter media.

1. Ability to Absorb One or More Contaminants from a Fluid Stream

The filter media of the present invention are capable of absorbing one or more contaminants from a fluid stream. A description of absorption versus adsorption is given below.

Absorption and adsorption are both thermodynamic processes, in that equilibrium is reached between the concentration of a species X present in the vapor state, and the concentration of the same species X in a condensed state. In adsorption, the thermodynamic driving force for condensation is the heat of adsorption. The total amount of adsorption that can occur is fundamentally limited by the available surface area of a given adsorption material. In addition, adsorption typically follows Langmuirian behavior, as per equation (1):

$$S_1/S = b_1 P_1/(1 + b_1 P_1 + b_2 P_2 + \ldots) \quad (1)$$

wherein $b_1 = 1/$(heat of adsorption of species 1); $P_1 =$ vapor pressure of species 1; and $S_1/S =$ fraction of surface area covered by species 1. Consequences of this behavior include a vapor concentration dependence on the capacity of an adsorbent (with lower vapor concentration leading to lower degrees of adsorption); a temperature dependence on the capacity of an adsorbent (with higher temperatures leading to lower degrees of adsorption); a rapid drop-off in capacity at even low levels of surface coverage (especially for weakly adsorbed species); and a competition for adsorption sites by different vapor species.

Moisture is particularly deleterious to adsorption processes, since water is highly condensable, is pervasive, and is present in high concentrations relative to the concentrations of the species that are to be removed. Because of these phenomena, adsorption processes possess inherent limitations. However, despite these limitations, adsorption is the predominant method used for removal of volatile compounds from an air stream, because it is generally regarded as the only method, which is kinetically fast enough to achieve meaningful reductions on one-pass contact of with an air stream.

To deal with the fundamental requirement of a surface to condense onto, technologies have been developed to create solids with very high surface areas. However, manufacture of such materials is tedious, expensive, and produces a limited variety of shapes (typically beads or powders), which must be further processed to create the final physical form of the adsorbent. Where the desired form is webs, sheets, or screens, the adsorbents often have to be physically adhered to the surface of a support structure.

Absorption into polymeric materials exhibits the same Langmuirian behavior as adsorption, but with some notable differences. First, as a permeant absorbs into the free volume of a medium, the medium will expand, thus creating more free volume. A consequence of this behavior is that the available free volume is dynamic, and thus inherently more tolerant to the presence of sorbed species. A second feature of absorption is that, because the sorption process occurs throughout the bulk of the medium, there is no inherent need to create high surface area solids or structures. A third feature of absorption is that absorption occurs in the free volume of the absorbing medium. Since the amount of this free volume is determined by the chemical composition of the medium, rather than the details of the manufacturing process, there are no fundamental limitations to the shape of an adsorption media, and variations in process conditions to create that media will have minimal impact on the capacity of the media.

The filter media of the present invention is capable of absorbing a variety of contaminants from a fluid stream, such as an air stream. The filter media may be used in an industrial setting, to combat chemical warfare, or in any other application requiring the removal of one or more contaminants from a fluid stream. Examples of contaminants that may be removed from a fluid stream using the filter media of the present invention include, but are not limited to, 2-vinylpyridine, caproic acid, nicotine, ammonia, toxic industrial chemicals, cresols, acetaldehyde, ethenylpyridines, chlorine, pyrrole, pyridine, environmental tobacco smoke, sulfur oxides, nitrogen oxides, hydrogen cyanide, amines, carboxylic acids, inorganic acids, and chemical warfare agents.

2. Ability to Convert Absorbed Contaminant into a Non-Volatile Reaction Product The filter media of the present invention is also capable of converting one or more absorbed contaminants into non-volatile reaction products. Reactive sites within the absorbent material of the filter media react chemically with the sorbed species within the absorbent material, as well as, sorbed species on an outer surface of the absorbent materials.

In the case of absorption, there is no requirement for reactant (i.e., sorbed contaminant) and reagent (i.e., reactive sites) to both be located on the surface of the absorbent, since diffusion through the bulk of the absorbent can permit contact and reaction to occur. Moreover, there is a much wider range of possible chemical reactions that can be employed than with adsorption, since the chemistries available are those that occur in liquid media. Thus, in addition to oxidation reactions, which are known to occur on surfaces, hydrolysis reactions, acid/base reactions, condensation reactions, nucleophilic reactions, and electrophilic reactions, all of which occur in liquid media, may occur in the absorption-based filter media of the present invention.

3. Ability to Absorb a Relatively Large Amount of Contaminants

The filter media of the present invention desirably has an absorption capacity, which enables extended use of the filter media during a given application. Desirably, the filter media of the present invention possesses an absorption capacity of at least 0.01 grams of captured contaminants per gram of absorptive system material (i.e., polymeric matrix material with optional additives). One method of determining the amount of captured contaminants is described below in the "Test Method" section of the examples.

In some embodiments of the present invention, the filter media possesses an absorption capacity of up to about 2.5 or more grams of captured contaminants per gram of absorptive system material (i.e., polymeric matrix material with optional additives) within the filter media (in some cases up to about 7.0 grams of captured contaminants per gram of absorptive system material). Typically, the filter media possesses an absorption capacity of from about 0.01 grams to about 2.5 grams of captured contaminants per gram of absorptive system material (i.e., polymeric matrix material with optional additives) within the filter media.

In addition to having a relatively large absorption capacity, the filter media of the present invention also possess an absorption efficiency for a given contaminant of as much as 99%.

4. Ability to Retain and Bind Water

The filter media of the present invention also has the ability to retain and bind water even when the filter media is exposed to a low humidity environment. One exemplary method of measuring a water retention factor of a given filter media is described in the "Test Method" section below and is entitled "Water Retention Test."

In one embodiment of the present invention, the filter media has a total water content (i.e., free water combined with bound water) of at least about 5 percent by weight based on a total weight of the absorptive system material (i.e., polymeric matrix material with optional additives excluding water). The total water content (i.e., free water combined with bound water) of the filter media of the present invention may be greater than about 10 (15, 20, 25, 30, 35, 40, 45, 50, or more) percent by weight based on a total weight of the absorptive system material (i.e., polymeric matrix material with optional additives excluding water).

In one desired embodiment of the present invention, the filter media has a total water content of at least about 34 percent by weight based on a total weight of the absorptive system material (i.e., polymeric matrix material with optional additives excluding water), wherein about 23 percent by weight of the water is free water, and 11 percent by weight is bound water, based on a total weight of the absorptive system material (i.e., polymeric matrix material with optional additives excluding water).

5. Ability to Act as a Biostat

The filters of the present invention also act as a biostat. As used herein, the term "biostat" refers to a material or object that not only prevents microbial and fungal growth, but also kills microbes. The filters of the present invention are biostat materials due to their ability to prevent microbial and fungal growth within the filter, but also kill microbes that come into contact with the filter. Unlike some known filters, the filters of the present invention do not need biocides or anti-microbial agents added to the filters in order to provide biostat characteristics to the filter.

B. Filter Components

The filter media of the present invention comprises one or more of the following components: a sorbent material, such as a polymer matrix containing at least one polymer having acidic or basic groups along the polymer chain; one or more optional additives, such as reactive additives and non-reactive additives; an optional substrate for supporting the sorbent material and/or optional additives; and an optional containment device for encompassing one or more of the filter components. A description of each filter component is provided below.

1. Absorptive System

As used herein, the term "absorptive system" is used to describe the materials used to form the absorbent component of the filter media of the present invention. The term "absorptive system" includes sorbent polymeric material and any additive combined with the sorbent material. The term "absorptive systems" does not include an optional substrate or any optional housing. Suitable exemplary absorptive systems are described below.

a. Sorbent Material

The sorbent material used to form the absorptive system for the filters of the present invention is desirably a polymer matrix comprising one or more polymeric materials, wherein at least one polymer of the polymer matrix contains acidic or basic groups along the polymer. In further embodiments of the present invention, the polymer matrix sorbent material comprises at least one polymer having acidic or basic groups along the polymer chain, and at least one additional polymer, such as a hygroscopic polymer, to assist in retaining water within the polymer matrix.

A variety of polymers may be used as the sorbent material in the filters of the present invention. Exemplary suitable polymers are described below.

i. Acidic/Basic Polymers

In one exemplary embodiment of the present invention, the sorbent material used to form the absorptive system desirably comprises at least one polymer having acidic or basic functional groups along the polymer chain. As used herein, the term "acidic functional group" includes any functional group that donates a proton. As used herein, the term "basic functional group" includes any functional group that accepts a proton. The acidic or basic functional groups provide reactive sites along the polymer chain for reacting with sorbed contaminants. The acidic/basic polymers may comprise a homopolymer or copolymer, wherein at least one monomer used to form the polymer contains one or more acidic or basic functional groups thereon. Alternatively, acidic/basic polymers may be formed by reacting a neutral polymer with one or more compounds resulting in acidic or basic functional groups on the previously neutral polymer.

Acidic/basic polymers may be formed by any other substitution and/or polymerization reactions such as graft polymerization.

A number of commercially available organic acidic/basic polymers may be used as the absorbent material in the absorptive system for the filters of the present invention. Examples of suitable organic acidic/basic polymers include, but are not limited to, acidic polymers such as polystyrene sulfonic acid, polyvinyl sulfonic acid, sulfonated polyvinyl naphthalenes, sulfonated polyvinyl anthracenes, sulfonated linear phenol formaldyhyde resins, condensation polyamides and polyesters containing comonomers such as sulfoisosphthalic acid salts, poly(glycolic acid), poly(lactic acid), poly(ethersulfone sulfonic acid) or poly(etheretherketone sulfonic acid), and poly(acrylic acid); basic polymers such as polyethyleneimine, ethoxylated polyethyleneimine, poly(ethersulfone-ortho-sulfonediamine), poly(4-vinylpyridine), poly(aniline), and poly(2-vinylphenol); and combinations thereof.

In addition to the organic acidic/basic polymers described above, inorganic acidic/basic polymers may also be used in the present invention as a suitable sorbent material. Suitable inorganic acidic/basic polymers include, but are not limited to, sol gels and ormosils (i.e., organically modified sol gels), wherein acidic or basic groups are covalently bonded throughout the sol gel or ormosil molecular structure.

ii. Hygroscopic Polymers

In a further embodiment of the present invention, the absorptive system for forming filters may further comprise at least one hygroscopic polymer in combination with one or more of the above-described acidic/basic polymers. Suitable hygroscopic polymers include, but are not limited to, polyethylene glycols, polymethacrylates, poly(2-hydroxyethyl methacrylate), polysaccharides, polyphosphonates, polyphosphates, polypentaerythritol ethoxylate, poly(N,N-dimethyl-3,5-dimethylene) piperidium chloride or hydroxide derivative thereof, quaternized polyimidazoline or hydroxide derivative thereof, polyacrylamide, and combinations thereof.

In another exemplary embodiment of the present invention, the hygroscopic polymers may be present as a suitable absorptive system component by combining one or more hygroscopic polymers with one or more reactive additives (e.g., compounds) having acidic or basic functional groups thereon. Suitable reactive additives are described below.

iii. Neutral, Non-Hygroscopic Polymers

Neutral, non-hygroscopic polymers may also be used to form a portion of the absorptive system of the filter media of the present invention. One or more neutral, non-hygroscopic polymers may be combined with one or more acidic/basic polymers, one or more hygroscopic polymers, and/or one or more reactive additives having acidic or basic functional groups thereon. Suitable neutral, non-hygroscopic polymers include, but are not limited to, polyethylene and polypropylene.

When neutral, non-hygroscopic polymers are used to form the absorptive system of the present invention, it is desirable to form a network of acidic/basic polymer and/or hygroscopic polymer material throughout the non-hygroscopic polymeric material to provide a pathway for proton transfer throughout the absorptive system. Reactive additives having acidic or basic functional groups thereon may be uniformly distributed within the network of acidic/basic polymer, hygroscopic polymeric material, or a combination thereof.

The filters of the present invention may comprise one or more of the above-described polymers for use as the absorptive system. In one exemplary embodiment of the present invention, the absorptive system used to form filters of the present invention comprises one or more of the above-described acidic/basic polymers in combination with one or more additional components, wherein the additional components may include other polymers (i.e., hygroscopic polymers, neutral, non-hygroscopic polymers, etc.) and/or optional additives described below. Typically, the absorptive system used to form filters of the present invention comprises from about 5 percent by weight (pbw) to 100 pbw of one or more of the above-described acidic/basic polymers in combination with from about 95 pbw to 0 pbw of one or more additional components, based on a total weight of the absorptive system. Desirably, the absorptive system used to form filters of the present invention comprises from about 5 percent by weight (pbw) to about 50 pbw of one or more of the above-described acidic/basic polymers in combination with from about 95 pbw to about 50 pbw of one or more additional components, based on a total weight of the absorptive system.

b. Optional Additives

A variety of additives may be incorporated into the absorptive system used to form filters of the present invention in order to provide one or more desired properties to the resulting filter. Suitable additives include reactive additives and non-reactive additives as described below.

i. Reactive Additives

One or more reactive additives (also referred to herein as "scavenging agents" or "sequestering agents") may be incorporated into the absorptive system used to form filters of the present invention. Typically, the one or more reactive additives are incorporated into the absorptive system to form a uniform distribution of reactive additives within the acidic/basic polymer matrix. Alternatively, one or more reactive additives may be positioned within the absorptive system used to form filters such that a non-uniform distribution of reactive additives is present. For example, a layer of reactive additives may be positioned between two outer layers of polymer material, or an outer surface of the polymeric material may be coated with one or more reactive additives. In other embodiments, a layer of reactive additives may be present separate from the polymer matrix of the filter media.

The use of one or more reactive additives will depend on the type of polymer(s) used to form the absorptive system of the filter. For example, when one or more acidic/basic polymers are used to form the absorptive system of the filter, reactive additives are not necessary to provide proton transfer throughout the absorptive system. However, in some embodiments using acidic/basic polymers, additional proton transfer capacity may be obtained by incorporating one or more reactive additives and/or hygroscopic polymers into the acidic/basic polymer-containing absorptive system.

A variety of reactive additives may be used in the present invention. Suitable reactive additives include, but are not limited to, catalytic reactants, stoichiometric reactants, catalytic/stoichiometric reactants, acid-scavenging agents, base-scavenging agents, reactive nanoparticles, or a combination thereof. Suitable catalytic reactants include, but are not limited to, strong acids (i.e., acids that are such good proton donors that their molecules do not remain in an aqueous solution), strong bases (i.e., bases that are such good proton aceptors that their molecules do not remain in an aqueous solution), transition metals (e.g., Cu), transition metal salts (e.g., cupric chloride), or a combination thereof. Suitable stoichiometric reactants include, but are not limited to, strong acids (e.g., sulfonic acid, some carboxylic acids, phosphoric acids, and some benzoic acids), weak acids (i.e., acids that do not completely convert to hydronium ions in an aqueous solution, such as acetic acid, some carboxylic acids, and some benzoic acids), strong bases (e.g., NaOH), weak bases (i.e., bases that do not completely react with water) such as ammonia, amines, ethylene diamine, and $Na_2CO_3$, primary amines (e.g., triethylamine), or a combination thereof. Water may also be considered a reactive additive due to its interaction with the polymer matrix containing at least one acid/base polymer and any optional acidic/basic reactive additives present.

When present within the absorptive system, the reactive additives react with one or more volatile contaminant species absorbed into the absorptive system to form one or more non-volatile reaction products. In this embodiment, the non-volatile reaction products are permanently fixed within the absorptive system preventing escape from the absorptive system of the absorbed volatile contaminant species.

The optional reactive additives enable the production of filter media specifically designed to remove a desired contaminant from a fluid stream. The reactive additives provide flexibility for use in filtration applications since the resulting absorptive system is capable of at least the following reactions: (i) oxidation reactions on an outer surface of the polymer matrix, and (ii) hydrolysis reactions, acid/base reactions, condensation reactions, nucleophilic reactions, and electrophilic reactions within a bulk volume of the polymer matrix.

The above-mentioned catalytic scavenging agents promote the reaction of one or more absorbed volatile compounds with one or more other components of an air stream, where the one or more other components include, but are not limited to, water, oxygen, and combinations thereof. Examples of reactions promoted by these catalysts include hydrolysis of esters, oxidation of aldehydes and mercaptans, decomposition of peroxides and ozone, and the like. In this embodiment, the scavenger itself is not consumed, and the amount of volatile compound scavenged may be much greater than the amount of catalytic scavenging agent(s) present.

The above-mentioned stoichiometric scavenging agents are consumed by reacting with one or more absorbed volatile compounds. Examples of stoichiometric reactions include neutralization of absorbed acids by weak and strong bases (such as reaction of caproic acid with an amine); neutralization of absorbed bases by weak and strong acids (such as neutralization of nicotine or ammonia by a sulfonic acid); chelation of volatile phosphorus compounds by metal salts (such as formation of copper phosphide by reaction of phosphine with copper salts); and the like.

In commercial and/or industrial applications, it may be desirable to remove many different volatile and semivolatile species from a fluid stream. To meet such demand, the absorptive system used to form filters of the present invention may include more than one type of reactive additive or scavenging agent in the absorptive polymeric matrix. In one desired embodiment, the polymeric matrix contains several different scavenging agents with the scavenging agents being catalytic, stoichiometric, or both catalytic and stoichiometric reactants. Moreover, it may be desirable to scavenge multiple volatile and semivolatile compounds that possess non-compatible functional groups. For example, it may be desirable to scavenge acids (such as,.for example, caproic acid) simultaneously with bases (such as, for example, nicotine). The absorptive system used to form filters of the present invention may be designed to remove these disparate compounds simultaneously from an air stream by physically separating acid-scavenging agents (or a basic polymer) from base-scavenging agents (or an acidic polymer) within the same filter.

Physical separation of incompatible reactive additives or scavenging agents (or acidic and basic polymers) may be accomplished by binding the respective acidic and basic functionalities to polymeric supports, which are physically separated from one another within the polymeric matrix (i.e., proton transfer cannot take place between the physically separated supports). An even greater degree of separation can be achieved by placing multiple layers of the absorptive polymeric matrix into a combined filtration system, wherein each layer contains different, incompatible scavengers and the layers are physically separated from one another to prevent proton transfer between the layers.

In one exemplary embodiment of the present invention, a combination of acid-scavenging agents and base-scavenging agents is physically present within the same absorptive system. In this embodiment, the acid-scavenging agents are physically separated from the base-scavenging agents in order to avoid premature reaction with one another within the absorptive system. As described above, layers of specific reactive additives, such as a layer of acid-scavenging agents and a separate layer of base-scavenging agents, may be incorporated within separate layers of polymer matrix material. Alternatively, separate layers of reactive reagents, such as a layer of acid-scavenging agent and a layer of base-scavenging agent, may be present physically separated from a polymer matrix altogether.

In a further exemplary embodiment of the present invention, reactive nanoparticles are incorporated into the absorptive system. Suitable commercially available reactive nanoparticles for use in the present invention include, but are not limited to, reactive nanoparticles available from NanoScale Materials, Inc. (Manhattan, Kans.) under the trade designation NanoActive™. At least the following NanoActive™ products may be used in the present invention: NanoActive™ Calcium Oxide, NanoActive™ Calcium Oxide Plus, NanoActive™ Cerium (IV) Oxide, NanoActive™ Magnesium Oxide, NanoActive™ Magnesium Oxide Plus, NanoActive™ Titanium (IV) Oxide, NanoActive™ Zinc Oxide, NanoActive™ Aluminum Oxide, NanoActive™ Aluminum Oxide Plus, and NanoActive™ Copper Oxide.

When present, the reactive additives are typically present in an amount of up to about 50 parts by weight based on a total weight of the absorptive system. Typically, the reactive additives are present within the absorptive system in an amount ranging from about 3 to about 30 percent by weight based on a total weight of the absorptive system.

ii. Non-Reactive Additives

The absorptive system used to form filters of the present invention may also include one or more optional non-reactive additives. Suitable non-reactive additives include, but are not limited to, water, glycerol, sorbitol, other alcohols, hygroscopic compounds, inert filler material for increasing overall surface area of filter media, or a combination thereof.

When present, the non-reactive additives may be present in an amount of up to about 50 percent by weight or more based on a total weight of the absorptive system used to form the filter.

2. Optional Substrates for Supporting the Absorptive System

The absorptive system used to form filters of the present invention may be applied onto an optional support or substrate to provide enhanced structural integrity to the absorptive system. Suitable substrates include, but are not limited to, non-woven fabrics, woven fabrics, knitted fabrics, films, foams, honeycomb supports (e.g., polymeric honeycombs), particulates, meshes or screens, fibers, flakes, powders, wood products, papers, glass, ceramics, beads, plywood, gypsum board, ceiling tiles, or any combination thereof. Suitable materials for forming substrates in the form of non-woven fabrics, woven fabrics, knitted fabrics, films, foams, honeycomb supports, particles, meshes, screens and fibers include, but are not limited to, polyolefins, such as polyethylene and polypropylene, polyesters, polyamides, such as Nylon 6 and Nylon 66, and cellulosics. When present, the optional substrate for supporting the absorptive system is desirably a non-woven fabric, which is coated by the absorptive system. In one desired embodiment of the present invention, the optional substrate comprises a polyamide non-woven fabric.

The amount of absorptive system coated onto a given substrate may vary depending on a number of factors including, but not limited to, the type of absorptive system, the type of substrate, and the desired use of the filter. Typically, when a substrate is present, the amount of absorptive system coating ranges from about 0.5 to about 8.0 parts by weight of coating for each part by weight of substrate. Desirably, when a substrate is present, the amount of absorptive system coating ranges from about 1.0 to about 5.0 parts by weight of coating for each part by weight of substrate, more desirably, from about 2.0 to about 3.0 parts by weight of coating for each part by weight of substrate.

The absorptive system coating may be present as a continuous or discontinuous coating on a given substrate. Desirably, the absorptive system coating is a continuous coating, which (i) encapsulates substrates such as particulates, powders, flakes, or beads, or (ii) completely coats a given surface of substrates such as films, sheets, paper, meshes, screens, fibers, foams, honeycomb, or fabrics.

In some embodiments of the present invention, the polymeric sorbent material itself may have enough structural integrity to act as a substrate for additional components such as one or more of the above-mentioned hygroscopic polymers, sequestering or scavenging agents, and/or non-reactive additives. For example, the acid/base polymeric sorbent material may be crosslinked to obtain a suitable reactive polymeric substrate. The resulting crosslinked acid/base polymeric sorbent material may be formed (e.g., molded) into any suitable filter configuration, such as a honeycomb structure.

3. Optional Housing for the Absorptive System

The filters of the present invention may further comprise an optional housing to provide structural integrity to the filter components. The housing may at least partially enclose one or more layers of polymeric matrix material of the filter media. The housing may be constructed of any material, which provides support for the filter components. Suitable materials for forming the housing include, but are not limited to, plastics, glass, metal, wood, ceramics, paper, cardboard, or any combination thereof. Typically, the optional housing comprises one or more housing components formed from polymers including, but are not limited to, polyolefins, such as polyethylene and polypropylene, polyesters, polyamides, such as nylon 6 and nylon 66, and cellulosics. Housing components may include, but are not limited to, a housing frame (i.e., the outer perimeter frame of a filter housing), one or more grids or screens along the fluid flow path of the filter, and a cover for allowing access to the absorptive system within the filter housing.

An exemplary filter media comprising a housing is shown in FIGS. 1a–1b. As shown in FIG. 1a, exemplary filter media 10 comprises sorbent material layer 11 partially enclosed and supported by housing 12. In this embodiment, a fluid stream, such as an air stream, flows through filter media 10 entering front surface 21 and exiting rear surface 22. FIG. 1b provides a cross-sectional view of filter media 10 along line A—A as shown in FIG. 1a. As shown in FIG. 1b, exemplary filter media 10 comprises first sorbent material layer 11 and second sorbent material layer 13 partially enclosed and supported by housing 12. First sorbent material layer 11 comprises first nonwoven support 14, first polymer matrix material 15 coated onto first nonwoven support 14, and first scavenging agent 16 distributed throughout first polymer matrix material 15. Second sorbent material layer 13 comprises second nonwoven support 17, second polymer matrix material 18 coated onto second nonwoven support 17, and second scavenging agent 19 distributed throughout second polymer matrix material 18. In this exemplary embodiment, first polymer matrix material 15 may be the same as or different from second polymer matrix material 18, first scavenging agent 16 may be the same as or different from second scavenging agent 19, and first nonwoven support 14 may be the same as or different from second nonwoven support 17. As shown in FIG 1b, gap 24 physically separates first sorbent material layer 11 from second sorbent material layer 13 to prevent possible proton transfer between first sorbent material layer 11 from second sorbent material layer 13.

Figure 2B:
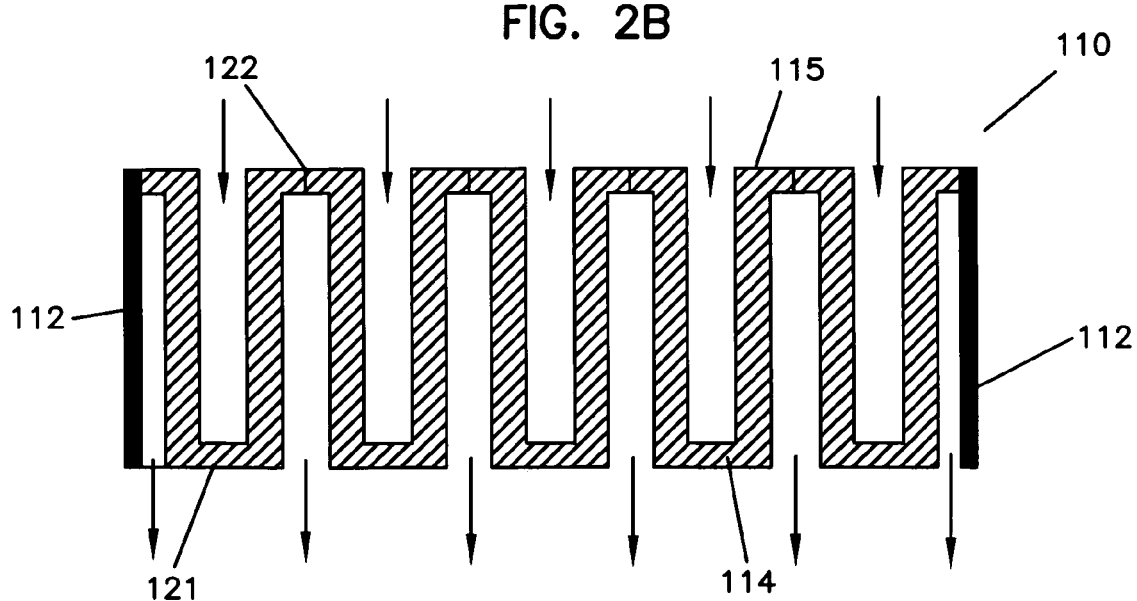
FIG. 2b provides a cross-sectional view of the exemplary filter media of FIG. 2a along line B—B.

A further exemplary filter media comprising a housing is shown in FIGS. 2a–2b. As shown in FIG. 2a, exemplary filter media 110 comprises sorbent material layer 111 partially enclosed and supported by housing 112. In this embodiment, a fluid stream, such as an air stream, flows through filter media 110 entering front surface 121 and exiting rear surface 122 (see FIG. 2b). FIG. 2b provides a cross-sectional view of filter media 110 along line B—B as shown in FIG. 2a. As shown in FIG. 2b, exemplary filter media 110 comprises first sorbent material layer 111 partially enclosed and supported by housing 112. First sorbent material layer 111 comprises support 114, polymer matrix material 115 coated onto support 114, and scavenging agent distributed throughout polymer matrix material 115.

The optional housing may comprise a housing similar to that used for activated carbon filters. In one embodiment of the present invention, glass beads having a bead diameter of up to about 5 mm, desirably from about 0.6 to about 1.5 mm, may be coated with sorbent polymeric material and then poured into a housing similar to that used for activated carbon filters. Housing for activated carbon filters typically comprise a plastic housing material (such as housing 12 as shown in FIG 1a), a front plastic mesh or screen, and a back plastic mesh or screen for encapsulating the absorptive system (e.g., a plastic mesh or screen along outer surface 21 and one along outer surface 22 as shown in FIG 1a).

In a further embodiment of the present invention, polymeric beads (e.g., sequestering agent in the form of beads) having a bead diameter of up to about 5 mm, desirably from about 0.6 to about 1.5 mm, may be coated with sorbent polymeric material and then poured into a housing similar to that used for activated carbon filters.

C. Filter Configuration

The components of the filters of the present invention may be configured in any manner so as to remove one or more contaminants from a fluid stream. For example, in some embodiments of the present invention, a fluid stream is simply brought into contact with a filter of the present invention. Such a configuration does not require the fluid stream to pass through the absorptive system, but only come into contact with the absorptive system. An example of such a configuration is a simple coating of absorptive system onto a substrate. In other embodiments of the present invention, the fluid stream flows through the absorptive system. One example of such a filter configuration is shown in FIGS. 1a–2b as described above.

Consequently, in some aspects of the present invention, an absorptive system is simply coated onto any given surface, similar to a coating of paint, to provide a two-dimensional (i.e., film-like) absorptive filtering system. In this embodiment, the absorptive system may be coated onto any surface (interior or exterior) of a room, building, or any of the above-mentioned substrates. As a fluid stream (e.g., air) passes over the film-like coating, the two-dimensional absorptive filtering system removes unwanted components from the fluid stream.

In other embodiments of the present invention, the absorptive system is coated onto a three-dimensional structure (i.e., a nonwoven fabric or honeycomb structure) resulting in a three-dimensional absorptive filtering system. As a fluid stream (e.g., air) passes over and/or through the three-dimensional structure, the three-dimensional absorptive filtering system removes unwanted components from the fluid stream.

In one embodiment of the present invention, the filter is configured so that the acidic/basic polymer does not come into contact with a user's hands during installation or operation. For example, a removable film may be used to cover one or more outer surfaces of the absorptive system of the filter when the absorptive system contains an acidic/basic polymer. Alternatively, the acidic/basic polymer may be positioned within the absorptive system of the filter. One example of such a configuration comprises a substrate (e.g., a nonwoven fabric, glass beads, a honeycomb structure, etc.), a first coating of acidic/basic polymer on the substrate, and a second coating of hygroscopic polymer over the first coating.

II. Methods of Making Filter Media

The present invention is further directed to methods of making filter media. One exemplary method of making a filter of the present invention comprises forming an absorptive system, wherein the absorptive system comprises one or more polymeric materials, and at least one polymer has acidic or basic functional groups along the polymer chain. Each of the one or more polymeric materials may be formed using any known polymerization technique including, but not limited to, free radical polymerization, anionic polymerization, cationic polymerization, and condensation polymerization. Additives including reactive and non-reactive additives, when present, may be blended with the one or more polymeric materials. When applicable, the blended polymeric materials may be allowed to swell due to the presence of water in the filter media. The blended polymeric materials may be applied to a substrate using any conventional coating technique.

In one exemplary embodiment of the present invention, a filter comprising polystyrene sulfonic acid, and water may be prepared using one or more of the following steps:

(1) weighing and combining polystyrene sulfonic acid and water to form a first mixture;
(2) blending the first mixture for a desired amount of time, typically less than about 10 minutes; and
(3) coating the first mixture onto a substrate using an appropriate coating technique.

A. Coating Techniques

Suitable coating techniques for use in the present invention include, but are not limited to, dip coating, spray coating, and foam coating. An exemplary description of each of the above-referenced coating methods is given below.

1. Dip-Coating

A pre-cut, pre-cleaned non-woven material, glass beads, or polymeric beads, or any other substrate may be dipped into a polymeric sorbent mixture to coat the substrate. The substrate, such as in the case of glass beads, or polymeric beads, may be stirred to ensure an even coating on the outer surface area of the substrate. The coated substrates may be allowed to dry for a desired period of time, typically up to about 24 hours.

2. Spray-Coating

The polymeric sorbent material mixture may be diluted with water and sprayed onto a given substrate. In one embodiment using a non-woven fabric substrate, the non-woven fabric substrate is washed in 30 wt % aqueous hydrogen peroxide ($H_2O_2$) for about five minutes. Excess $H_2O_2$ is allowed to drain from the non-woven fabric substrate. After drying, the diluted polymeric sorbent material mixture is sprayed onto the dry non-woven material using a high-pressure sprayer connected to a high-pressure compressed gas source. The coated substrate is allowed to dry for a period of time, typically about an hour, and then resprayed using the same procedure if so desired. The drying time may be faster by using heat lamps.

3. Foam Coating

The polymeric sorbent material mixture may be exposed to bubbling carbon dioxide ($CO_2$) during an initial swelling period (i.e., during step (6) discussed above) to create a foam coating. A pre-cut, pre-cleaned filter material substrate may be dipped into or brought into contact with the foam to coat the filter media substrate. Once a sufficient amount of coating has coated the filter media substrate, the coated substrate is allowed to dry and complete swelling for a desired period, typically up to about 24 hours.

B. Other Possible Method Steps

The exemplary method of making a filter of the present invention may further comprise one or more of the following steps:

(1) selecting one or more polymer matrix materials, wherein at least one polymer comprises an acidic/basic polymer;
(2) combining one or more hygroscopic polymers with the acidic/basic polymer;
(3) combining one or more neutral, non-hygroscopic polymers with the acidic/basic polymer;
(4) combining one or more reactive additives with the one or more polymer matrix materials;
(5) combining one or more non-reactive additives with the one or more polymer matrix materials;
(6) optionally crosslinking one or more polymers within the polymer matrix including the acidic/basic polymer, the hygroscopic polymer, and/or the neutral, non-hygroscopic polymer, when present;

(7) combining one or more reactive additives having acidic or basic functional groups thereon with one or more polymers within the polymer matrix including the acidic/basic polymer, the hygroscopic polymer, and/or the neutral, non-hygroscopic polymer, when present;
(8) distributing one or more reactive additives within one or more polymers of the polymer matrix;
(9) positioning one or more reactive additives proximate to, but separate from, one or more polymers of the polymer matrix;
(10) distributing one or more non-reactive additives within one or more polymers of the polymer matrix;
(11) positioning one or more non-reactive additives proximate to, but separate from, one or more polymers of the polymer matrix;
(12) incorporating two or more incompatible reactive additives into the same filter media;
(13) incorporating an acidic polymer and a basic polymer within the same filter media, physically separating each from one another by a medium that is not capable of proton transfer (e.g., air, a hydrophobic material, etc.) (e.g., gap 24 in FIG. 1b);
(14) physically separating two or more incompatible reactive additives from one another within the same filter media;
(15) incorporating a first reactive additive into a first polymer matrix material, and incorporating a second reactive additive into a second polymer matrix material, wherein the first reactive additive is incompatible with the second reactive additive;
(16) combining an acid/base polymeric sorbent material with an optional substrate;
(17) coating at least one polymeric matrix material onto an optional substrate during one or more coating steps;
(18) drying a coating applied to an optional substrate;
(19) foaming at least one polymeric matrix material; and
(20) incorporating at least one polymeric matrix material into an optional housing.

It should be understood that the methods of making filters of the present invention may include one or more of any of the above-described method steps. For example, multiple coating steps may be used to increase the amount of a given coating on a given substrate or to provide multiple different coatings on a given substrate. Further, multiple drying steps may be used to provide intermediate and final dried coatings on a given substrate.

III. Methods of Using Filter Media to Remove One or More Contaminants

The present invention is also directed to methods of using filters to remove particles and/or one or more of the above-described contaminants from a fluid stream. One exemplary method for removing particles and/or one or more volatile or semivolatile compounds from a fluid stream comprises bringing the fluid stream and a filter of the present invention in contact with one another. As discussed above, the contacting step may simply require the fluid stream to contact a portion of the absorptive system. In some embodiments, the contacting step may comprise passing the fluid stream through a portion of the absorptive system.

The exemplary method for removing one or more volatile or semivolatile compounds from a fluid stream may further comprise one or more of the following steps:
(1) positioning a filter media of the present invention proximate to a fluid stream;
(2) incorporating a filter media of the present invention into an air filtration system;
(3) incorporating a filter media of the present invention into an air filtration system, wherein the air filtration system comprises a face mask, a body suit, an air conditioning system, ductwork of a building or vehicle, an air recirculation system of a vehicle or airplane, a military vehicle, or a combination thereof;
(4) matching specific components of the filter media with specific contaminants or compounds that are to be removed from a fluid stream; and
(5) making a filter media to specifically remove a given contaminant or compound.

Selection of particular absorptive polymeric matrices and scavenger systems is dependent on the end-use criteria for the fluid (e.g., air) filtration system. In some applications, removal of trace amounts of volatile and semivolatile compounds may be desired, while in other applications the ability to remove high concentrations of one or more contaminants or compounds may be desired. Other performance criteria may include, but are not limited to, the temperature and humidity of the incoming air, the expected service life of the absorptive polymeric matrix, the cost of the total absorption system, the degree of one-pass removal desired, and whether the filter is expected to be reused, or merely replaced.

To maximize the effectiveness of a given scavenging system, it is desirable for there to be both a kinetically acceptable rate of reaction, and sufficient thermodynamic driving force. While the thermodynamic driving force can, in principle, be provided simply through concentration effects (i.e., increased concentration of a given acidic polymer, basic polymer, and/or scavenging agent within an absorptive system), at least some scavenging systems inherently possess a significant heat of reaction. An additional benefit of hydrophilic polymer matrices is that any heat generated by the scavenging reaction is absorbed by the large amount of contained water, thus limiting any temperature rise. In addition, vaporization of water from the polymeric matrix will further compensate for any heat of reaction; thus, these systems are expected to inherently possess a temperature-control feature. This feature minimizes and/or eliminates the need for incorporation into the filter design of specific heat-radiating members, such as those disclosed in known adsorptive-type filtration systems.

The present invention is further illustrated by the following examples, which are not to be construed in any way as imposing limitations upon the scope thereof. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

TEST METHODS

The following test methods may be used to evaluate one or more characteristics of the filter media of the present invention.

Absorption Capacity/Efficiency Test

Figure 3A:
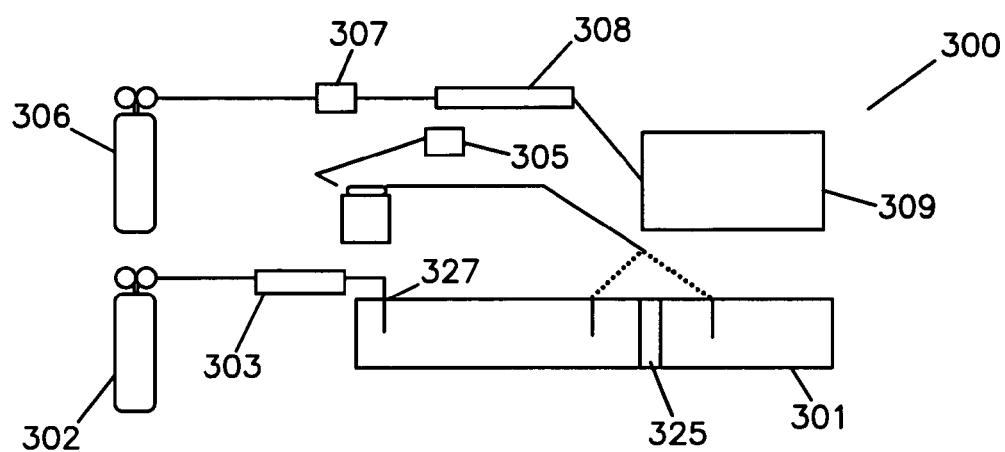
FIG. 3a depicts a schematic of an exemplary complete 30.5 cm (1 foot)×30.5 cm (1 foot) testing system for measuring the absorption of a given filter media.

The absorption capacity and efficiency of a given filter may be measured as follows using a 30.5 cm (1 foot)×30.5 cm (1 foot) test duct system. An exemplary 30.5 cm (1 foot)×30.5 cm (1 foot) test duct system is shown in FIG. 3a.

Exemplary test duct system 300 comprises duct 301, test gas supply 302, rotometer 303, vacuum pump 304, test sample mass flow controller 305, zero grade air supply 306, air mass flow controller 307, dilutor 308, and monitoring system 309. A more detailed schematic of duct 301 is shown in FIG. 3b.

Figure 3B:
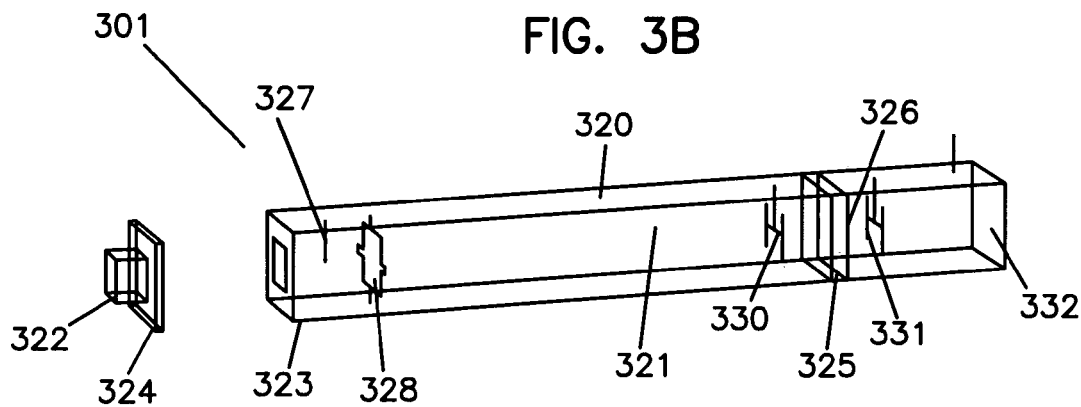

As shown in FIG. 3b, duct 301 comprises a sheet of eight-foot stainless steel sheet 320 formed into a square duct 301 and welded along top seams 321 with a blower fan 322 on fan mounting plate 324 at end 323. Fan 322 creates a positive pressure airflow through the duct 301 and test filter 325 positioned within test filter holder 326. An injection port 327 is positioned approximately one foot downstream of fan 322. An eight-inch square perforated plate 328 is positioned approximately six inches downstream of injection port 327. Test filter holder 326 comprises a two-inch deep filter bracket, and is positioned approximately six and half feet downstream from fan 322.

In operation, samples are collected at upstream sample port 330 and downstream sample port 331 located on either side of test filter 325. The air flow in duct 301 is controlled by varying the fan speed and air intake to fan 322. Test filters 325 are inserted into test filter holder 326 for two-inch filters, or installed from open exhaust end 332 of test duct 301 and secured to a downstream filter bracket of test filter holder 326. Test gas is injected into duct 301 and measured upstream and downstream of the filter 325 as required.

Two separate fluid streams, one from upstream sample port 330 and one from downstream sample port 331, are collected through vacuum pump 304, test sample mass flow controller 305 and dilutor 308. Monitoring system 309 detects the test gas concentration in the two separate fluid streams, and provides output relating to the absorption of a given test gas within a given test filter 325. The removal effectiveness is calculated from comparison of the upstream and downstream concentrations of the challenge gas.

Water Content Test Using Thermogravimetric Analysis

A Thermogravimetric/Differential Thermal Analyzer (TG/DTA) may be used to determine the water content of the gel. The TG/DTA uses two matched analytical balance arms inside a temperature-controlled furnace to measure weight loss versus temperature of small samples. Aluminum sample pans, approximately 2 mm in size, are used to hold the samples. An empty pan is placed on one of the balance arms for a reference and an empty pan is placed on the other balance arm in order to tare the instrument. The sample pan is removed and a small sample having a sample weight of approximately 10 to 50 mg is placed in the sample pan. The furnace is sealed around the balance arms and a flow of argon is established through the furnace in order to create an inert environment and sweep gases produced during the analysis. The analysis is started and the furnace ramps from 25° C. to 400° C. at 25° C. per minute. The computer records weight loss versus temperature to produce a graph that can be analyzed to determine free and bound water loss.

Typically, the loss of free water and other volatiles is at a relatively constant rate from 25° C. to just over 100° C., and then there is a rapid loss of weight in the sample corresponding to the loss of bound water in a given polymeric mixture sample. These marked changes in the weight of the polymeric mixture sample are used to determine the percent weight loss, which corresponds to the volatile and free water content, and the bound water content of the polymeric mixture sample.

Water Retention Test

Water retention may be measured by measuring changes in viscosity over temperature and time. Viscosity measurements are made using a CSR-10 rheometer with extended temperature option. Tests are run (i) at constant temperature (25° C.) with various shear rates (0.5 to 5.0 s$^{-1}$) and (ii) constant shear rate (1.0 s$^{-1}$) with various temperatures (10 to 40° C.). For all tests, a 20 mm parallel plate is used as the measuring device with a gap setting of 1 mm. Additionally, the tests are repeated with various batches of polymeric media over a thirty-day time period to ascertain the changes in viscosity (and water retention) over time.

EXAMPLES

The following examples provide a description of exemplary filter media of the present invention.

Filter Materials

The materials shown in Table 1 were used in the examples below.

TABLE 1

Materials Used In Examples

| Material | Description | Manufacturer |
|---|---|---|
| Sorbent Materials | | |
| polystyrene sulfonic acid | polymer having a MW$_w$ of about 70,000 | Sigma-Aldrich Chicago, IL |
| polyethyleneimine | polymer having a MW$_w$ of about 60,000 | Sigma-Aldrich Chicago, IL |
| ethoxylated polyethyleneimine | polymer having a MW$_w$ of about 70,000 | Sigma-Aldrich Chicago, IL |
| polyacrylic acid | polymer having a MW$_w$ of about 240,000 | Sigma-Aldrich Chicago, IL |
| poly(acrylamide) | polymer having a MW$_w$ of about 1 million to about 50 million | Sigma-Aldrich Chicago, IL |
| polyethylene glycol | polymer having a MW$_w$ of about 5000 | Sigma-Aldrich Chicago, IL |
| Substrates | | |
| aluminum mesh filter substrate | nonwoven fabric | DuPont Chemical Company Wilmington, DE |
| fiberglass nonwoven fabric | nonwoven fabric | DuPont Chemical Company Wilmington, DE |
| Glass Beads | 0.6, 0.8, and 1.5 mesh beads | Sigma-Aldrich Chicago, IL |

Example 1

Preparation of a Filter Media Comprising an Acidic Polymer

A filter was prepared using polystyrene sulfonic acid as the acidic polymeric sorbent material. An aqueous solution containing 20 g of polystyrene sulfonic acid (weight average molecular weight of 70,000) per 100 g of deionized water was poured into a dip pan.

A fiberglass filter substrate weighing 18.25 g and having dimensions 24.76 cm (9.75 in)×60.96 cm (24 in)×2.54 cm (1.0 in) was dipped into the mixture and removed to dry overnight. The dry coated fiberglass filter substrate weighed 25.86 g. The amount of absorptive material (i.e., polystyrene sulfonic acid and water) per gram of filter substrate was 0.42 g of absorptive material per g of filter substrate.

Example 2

Preparation of a Filter Media Comprising a Basic Polymer

A filter was prepared using polyethyleneimine as the basic polymeric sorbent material. 150 ml of an aqueous solution of ethoxylated polyethyleneimine (37% solids, 80% ethoxylated) (weight average molecular weight of 70,000) was combined with 75 ml of methanol and mixed in a mixing vessel. The mixture was blended for about 3 minutes.

A fiberglass filter substrate weighing 17.47 g and having dimensions 24.76 cm (9.75 in)×60.96 cm (24 in)×2.54 cm (1.0 in) was dipped into the mixture and removed to dry overnight. The dry coated fiberglass filter substrate weighed 44.84 g. The amount of absorptive material (i.e., ethoxylated polyethyleneimine) per gram of filter substrate was 1.57 g of absorptive material per g of filter substrate.

The resulting filter was used to remove cigar smoke from a room.

Example 3

Preparation of a Filter Media Comprising an Acidic Polymer

A filter was prepared using polyacrylic acid as the acidic polymeric sorbent material. An aqueous solution containing 50 mg of polyacrylic acid (weight average molecular weight of 240,000) per ml of deionized water was prepared in a mixing vessel. The mixture was blended for about 3 minutes.

A fiberglass filter substrate weighing 18.69 g and having dimensions 24.76 cm (9.75 in)×60.96 cm (24 in)×2.54 cm (1.0 in) was dipped into the mixture and removed to dry overnight. The dry coated fiberglass filter substrate weighed 25.23 g. The amount of absorptive material (i.e., polyacrylic acid and water) per gram of filter substrate was 0.35 g of absorptive material per g of filter substrate.

Example 4

Preparation of a Filter Media Comprising a Hygroscopic Polymer in Combination with an Acidic Polymer A filter was prepared using the procedure as outlined in Example 1 except 25 g of polyacrylamide (weight average molecular weight of about 1 million to about 50 million) was added to the mixture. The mixture was blended for about 10 minutes.

A fiberglass filter substrate weighing 18.25 g and having dimensions 24.76 cm (9.75 in)×60.96 cm (24 in)×2.54 cm (1.0 in) was dipped into the mixture and removed to dry overnight. The dry coated fiberglass filter substrate weighed 35.44 g. The amount of absorptive material (i.e., polystyrene sulfonic acid, polyacrylamide and water) per gram of filter substrate was 0.94 g of absorptive material per g of filter substrate.

Example 5

Preparation of a Filter Media Comprising an Acidic Polymer and a Basic Polymer A filter having a filter configuration as shown in FIGS. 1a–1b was prepared by assembling the filter formed in Example 1 and the filter formed in Example 2 in a filter housing. An air gap having an average width of about 1 cm physically separated the polystyrene sulfonic acid filter from the ethoxylated polyethyleneimine filter.

Example 6

Preparation of a Filter Media Comprising an Acidic Polymer and a Hygroscopic Polymer A polystyrene sulfonic acid mixture was prepared as in Example 1. The polystyrene sulfonic acid mixture was sprayed onto the outer surface of glass beads having a bead size of 0.8 mesh. The coated beads were allowed to dry.

A polyethylene glycol mixture was prepared using 25 g of polyethylene glycol in 100 g of deionized water. The polyethylene glycol mixture was blended for about 3 minutes. The polyethylene glycol mixture was then oversprayed onto the coated glass beads to form an overcoating, which encapsulated the polystyrene sulfonic acid coating. The resulting beads were allowed to dry overnight.

The beads were poured into a rectangular-shaped plastic housing (45.7 cm×45.7 cm×2.54 cm) having outer mesh screens on outer surfaces (i.e., the 45.7 cm×45.7 cm surfaces).

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A method of removing particles or one or more volatile or semi-volatile compounds from a fluid stream, said method comprising the steps of:
bringing the fluid stream into contact with a filter, wherein the filter comprises an absorptive system containing at least one acidic polymer, at least one basic polymer, or a combination of at least one acidic polymer and at least one basic polymer physically separated from one another.

2. A filter comprising an absorptive system comprising a polymer chain having acidic or basic groups along the polymer chain comprising polystyrene sulfonic acid.

3. The filter of claim 2, wherein the absorptive system comprises a first layer containing the polystyrene sulfonic acid, and a physically separated second layer containing ethoxylated polyethyleneimine.

4. The filter of claim 2, wherein the absorptive system further comprises one or more hygroscopic polymers.

5. The filter of claim 4, wherein the one or more hygroscopic polymers are selected from the group consisting of polyethylene glycols, poly(2-hydroxyethyl methacrylate), polypentaerythritol ethoxylate, poly(N,N-dimethyl-3,5,dimethylene) piperidium chloride, quaternized polyimidazoline, polyacrylamide, and combinations thereof.

6. The filter of claim 2, wherein the absorptive system further comprises one or more non-volatile species within the absorptive system, wherein the one or more non-volatile species are reaction products resulting from one or more reactions with one or more reactive additives within the absorptive system.

7. The filter of claim 2, further comprising a substrate, wherein the absorptive system coats at least a portion of an outer surface of the substrate.

8. The filter of claim 7, wherein the substrate comprises a non-woven fabric, a woven fabric, a knitted fabric, a film, a foam, a honeycomb structure, particulate material, a mesh or screen, a fiber, a wood product, paper, a glass sheet or bead, a ceramic bead, a polymeric bead, plywood, gypsum board, a ceiling tile, or any combination thereof.

9. The filter of claim 7, wherein the substrate comprises a non-woven fabric, a woven fabric, a knitted fabric, a film, a foam, a honeycomb structure, particulate material, a mesh or screen, a fiber, a flake, a powder, or a polymeric bead; and wherein the substrate is formed from polyolefin, polyethylene, polypropylene, a polyester, a polyamide, nylon 6, nylon 66, a cellulosic material, or a combination thereof.

10. The filter of claim 7, further comprising a housing to at least partially contain the absorptive system, the substrate or both.

11. A method of removing particles or one or more volatile or semi-volatile compounds from a fluid stream, said method comprising:
bringing the fluid stream and the filter of claim 2 in contact with one another.

12. The method of claim 11, wherein the fluid stream comprises an air stream.

13. A filter comprising:
an absorptive system containing at least one acidic polymer, at least one basic polymer, or a combination of at least one acidic polymer and at least one basic polymer physically separated from one another;
a substrate, wherein the absorptive system coats at least a portion of an outer surface of the substrate; and
an optional housing to at least partially contain the absorptive system, the substrate or both.

14. The filter of claim 13, wherein the acidic polymer is selected from the group consisting of polystyrene sulfonic acid, polyvinyl sulfonic acid, and poly(acrylic acid); and the basic polymer is selected from the group consisting of polyethyleneimine, ethoxylated polyethyleneimine, and poly(2-vinylphenol).

15. The filter of claim 13, wherein the absorptive system comprises a combination of the at least one acidic polymer and the at least one basic polymer physically separated from one another.

16. The filter of claim 13, wherein the absorptive system further comprises water.

17. A method of removing particles or one or more volatile or semi-volatile compounds from a fluid stream, said method comprising:
bringing the fluid stream and the filter of claim 13 in contact with one another.

18. The method of claim 17, wherein the fluid stream comprises an air stream.

19. A filter comprising an absorptive system comprising:
(i) a first layer containing a polymer chain having acidic or basic groups along the polymer chain, and
(ii) a second layer containing one or more hydroscopic polymers, wherein the first layer is separate from and in contact with the second layer.

20. The filter of claim 19, wherein the second layer represents at least one outermost layer of the filter, while the first layer does not represent an outermost layer of the filter.

21. A filter comprising an absorptive system comprising:
(i) an acidic/basic polymer selected from the group consisting of polystyrene sulfonic acid, polyvinyl sulfonic acid, poly(acrylic acid), polyethyleneimine, ethoxylated polyethyleneimine, poly(2-vinylphenol), sol gels having acidic or basic groups thereon, orgosils having acidic or basic groups thereon, and combinations thereof;
(ii) one or more hygroscopic polymers selected from the group consisting of polyethylene glycols, poly(2-hydroxyethyl methacrylate), polypentaerythritol ethoxylate, poly(N,N-dimethyl-3,5,dimethylene) piperidium chloride, quaternized polyimidazoline, polyacrylamide, and combinations thereof; and
(iii) one or more reactive additives selected from the group consisting of catalytic reactants, stoichiometric reactants, catalytic/stoichiometric reactants, acid-scavenging agents, base-scavenging agents, reactive nanoparticles, water, and a combination thereof.

* * * * *